July 24, 1951
P. G. VICARD
2,561,717
HEAT GENERATOR COMPRISING RETURN MEANS
FOR MOISTENED SMOKE AND GAS
Filed July 30, 1947
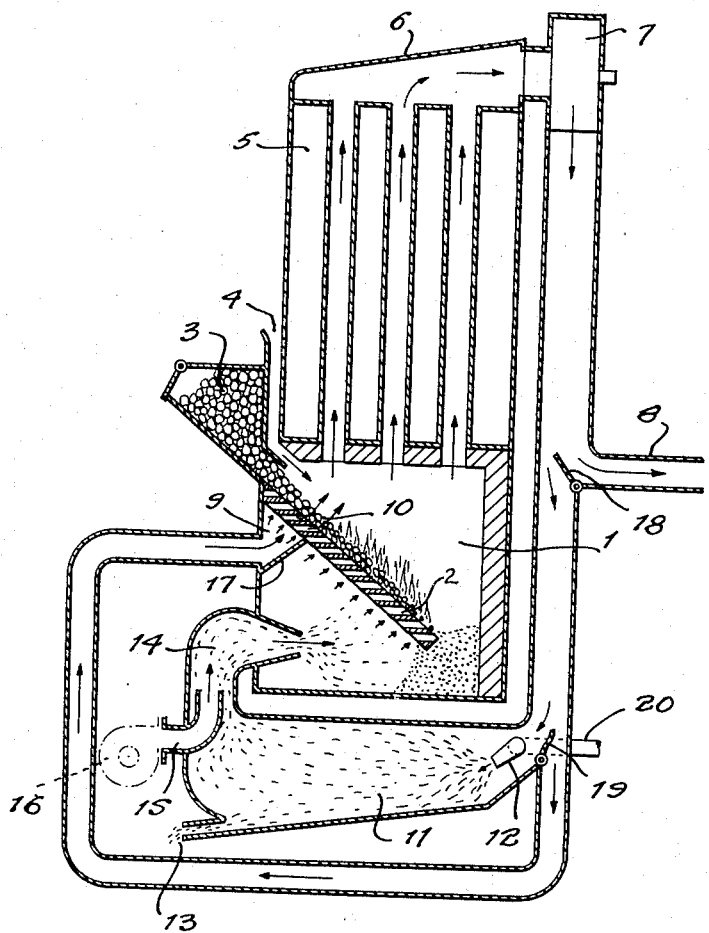
INVENTOR.
Pierre Georges Vicard
BY Patented July 24, 1951

2,561,717

UNITED STATES PATENT OFFICE 2,561,717

HEAT GENERATOR COMPRISING RETURN MEANS FOR MOISTENED SMOKE AND GAS

Pierre Georges Vicard, Lyon, France

Application July 30, 1947, Serial No. 764,769
In France June 29, 1944

Section 1, Public Law 690, August 8, 1946
Patent expires June 29, 1964

6 Claims. (Cl. 110—49)

The present invention relates to heat generators and more particularly relates to heat generators utilizing fuels of high content of ashes and fusible ashes and has among its objects the provision to raise the efficiency of heat generators of that type.

Generally, it is possible to increase the combustion efficiency of any type grate of a furnace, whether hand fired or mechanically fired, by one of the following methods:

First.—By increasing the rate of flow of the combustion air through the layer of the fuel and by raising the temperature of said combustion air. But, for a given size of surface area of the grate and of layer of the fuel, the increase in rate of flow of the combustion air leads to an increase in quantity thereof and, finally, to an excess of air which causes an unsatisfactory output.

Second.—By introducing steam into the combustion air in order to suppress the slag formation caused by forced operation. However, in order to introduce into the combustion air a sufficient quantity of steam, a large boiler is necessary which uses up a considerable amount of the available heat.

Third.—By drying and preheating the fuel in order to make it more readily inflammable. However, these operations are difficult to perform in a uniform way throughout the thickness of the layer.

The present invention makes it possible to obtain the advantages of all three of the above mentioned methods without incurring the outlined inconvenience.

It comprises the provision of a secondary circuit in parallel with the main circuit of the combustion gases, effected by a fan which is capable of forcing, first through the grate and then through the device utilizing the developed heat, an amount of gas larger than the one resulting from a normal combustion but delivering to the chimney a volume that corresponds only to a normal combustion, while the surplus is directed in a secondary circuit partly through the layer of fresh fuel placed at the entrance of the grate serving to dry and preheat the fuel, partly, after having been adequately moistened, through the layer of fuel about to be consumed on the grate.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

The drawing illustrates by way of example one embodiment of the invention, shown in schematic, as applied to a heat generator or boiler.

As disclosed in the drawing, a furnace has on the interior a combustion chamber 1 with an inclined fuel grate 2 connected to a wall of said furnace, said grate 2 located in said combustion chamber 1 and charged with fuel 3 by gravity, overfire air being furnished to the grate by a conduit 4. A heat exchanger 5 above said combustion chamber 1 and a gas collector 6 form part of the device.

In the following the elements are described which provide the parallel circuits of the combustion gases, referred to in the foregoing: They comprise a fan 7 drawing in by suction the gases collected in the collector 6 for accelerating the movement thereof and forcing them through a passage provided by an enclosure structure, to be directed partly to a chimney 8 and partly to the chambers specified below. Damper 18 controls the flow of gases to the chimney 8. One chamber 9 is a smoke box disposed at the entrance of the grate 2 and below the same directing one part of the gases through a layer 10 of the fresh fuel so as to dry and preheat it. Partition 17 separates smoke box 9 from the ash pit beneath grate 2. A tank is located below said furnace and comprises a moistening chamber 11 through which the rest of the gases are directed so as to evaporate water which has been atomized in the chamber 11 by a suitable spraying device 12 which receives water through pipe 20; this chamber 11 is provided, as shown, with a discharge opening 13 for the drainage of accumulating water. Damper 19 simultaneously regulates the flow of gases to the smoke box 9 and to the moistening chamber 11. The device furthermore comprises a nozzle 14 in order to bring about the uniform mixture of the moistened combustion gases of the chamber 11 with outside air arriving through a mixer jet 15. It is in this nozzle 14 where the gases loaded with evaporated water are mixed with primary combustion air drawn in from the outside and thereafter directed by the nozzle 14 to the underside of said grate 2.

The fan 7 insures an intake by suction which permits to regulate in any desired manner the volume and relation of primary air mixed with the moistened gases and directed under the grate and of the overfire air introduced above the grate.

It will be noted that the smoke box 9 is charged entirely with non-combustible combustion gases; this non-combustible gas acts as a barrier which limits the zone of combustion at the entrance of the fuel to the grate for preventing the extension of the fire into the fuel feeding means.

If the fuel which is used, is in the form of a thick layer, consisting of small grains, the normally existing draught, which usually cannot provide a considerable depression in the combustion chamber, is insufficient for overcoming the high resistance of said layer. In this case the fan 7 has to be operated so as to force the gases under pressure through the grate and the layer of fuel. It is evident that under such circumstances the primary combustion air cannot be introduced into the moistening chamber by suction, but it is necessary to add a blower 16 at the lower end of said mixer jet 15.

The combustion gases at the discharge end of the generator are of a sufficiently high temperature for drying the fuel. This temperature varies according to the rate at which the generator operates, and the evaporation of water varies accordingly in the same way; this has a certain automatic regulating effect and avoids an excess of evaporated water when the operation occurs at a reduced rate.

The gases entering the moistening chamber contain already the humidity previously acquired, whereby the evaporation of water in the moistening chamber is proportionally decreased; this of course, results in saving of heat.

The gases used for drying and preheating mix thereafter with the combustion gases above the grate 2; they increase the weight of the gases which carry the effective heat to the exchanger thereby lowering the temperature of said gases and permitting to avoid a dangerous temperature range.

It should be understood that any device for speed regulation may be installed in the conduits through which the gases are flowing, as may be required to provide proper distribution.

It will be understood that each of the elements described above, or two or more together, may also find a useful application in other types of heat generators differing from the types described above.

While I have illustrated and described the invention as embodied in heat generators, I do not intend to be limited to the details shown, since various modifications and structural changes may be made without departing in any way from the spirit of my invention.

Without further analysis, the foregoing will so fully reveal the gist of my invention, that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a heat generator, a furnace comprising walls forming on their interior a combustion chamber and a smoke box adjacent said combustion chamber and separated from said combustion chamber by a partition, and having in the uppermost portion of said combustion chamber an opening for the admission of overfire air; an inclined fuel grate arranged to provide with an upper portion a cover for said smoke box and connected with relation to one of said walls of said furnace and extending through a portion of said combustion chamber; a heat exchanger connected with relation to said furnace and arranged to communicate with said combustion chamber for receiving combustion gases developed in said combustion chamber by the combustion of fuels on said inclined grate; a gas collector mounted adjacent said heat exchanger and comprising a wall having an aperture and arranged to collect gases emitted from the interior of said heat exchanger and to conduct the same through said aperture in said wall; a tank mounted below said furnace and comprising a wall enclosing a moistening chamber and having an opening near the lowermost portion of said moistening chamber through which liquids accumulating in said portion may drain to the exterior of said tank and having another opening for admitting combustion gases into said moistening chamber; an atomizer mounted in said moistening chamber near said other opening and arranged to spray atomized water in the path of combustion gases passing through said other opening into said moistening chamber, for causing said gases to vaporize the atomized water; means for supplying water to said atomizer; a nozzle connected to said tank and arranged to communicate with said moistening chamber and protruding through one of said walls of said furnace and having an outlet below said fuel grate in said combustion chamber; a mixer jet extending to the interior of said nozzle and so arranged as to conduct fresh air from the outside to the interior of said nozzle and to cause said fresh air to be mixed in said nozzle with combustion gases emanating from the moistening chamber and containing evaporated water, said nozzle being arranged to direct said mixture to the underside of said fuel grate, and a conduit means connected to said gas collector, to said tank, to said furnace, and to an adjacent chimney and arranged to provide an enclosed passage for the gases emanating from said gas collector at said aperture and continuously to direct a portion of said gases to said chimney; another portion to said opening of said tank for passage into said moistening chamber, and the remaining portion to said smoke box in said furnace for drying and preheating fuels spread on the portion of said fuel grate covering said smoke box.

2. In a heat generator, a furnace comprising walls forming on their interior a combustion chamber; a fuel grate connected with relation to one of said walls of said furnace and extending through a portion of said combustion chamber; a heat exchanger connected with relation to said furnace and arranged to communicate with said combustion chamber for receiving combustion gases developed in said combustion chamber by the combustion of fuels on said fuel grate; a gas collector mounted adjacent said heat exchanger and comprising a wall having an aperture and arranged to collect gases emitted from the interior of said heat exchanger and to conduct the same through said aperture in said wall; a tank mounted below said furnace and comprising a wall enclosing a moistening chamber and having an opening near the lowermost portion of said moistening chamber through which liquids accumulating in said portion may drain to the exterior of said tank and having another opening for admitting combustion gases into said moistening chamber; an atomizer mounted in said moistening chamber near said other opening and arranged to spray atomized water in the path of combustion gases passing through said other opening into said moistening chamber, for causing said gases to vaporize the atomized water; means for supplying water to said atomizer; a nozzle connected to said tank and arranged to communicate with said moistening chamber and protruding through one of said walls of said furnace and having an outlet below said fuel grate in said combustion chamber; a mixer jet extending to the interior of said nozzle and so arranged as to conduct fresh air from the outside to the interior of said nozzle and to cause said fresh air to be mixed in said nozzle with combustion gases emanating from the moistening chamber and containing evaporated water, said nozzle being arranged to direct said mixture to the underside of said fuel grate; a conduit means connected to said gas collector, to said tank, to said furnace, and to an adjacent chimney and arranged to provide an enclosed passage for the gases emanating from said gas collector at said aperture and continuously to direct a portion of said gases to said chimney, another portion to said opening of said tank for passage into said moistening chamber, and the remaining portion to said combustion chamber in said furnace and below said fuel grate; and a fan mounted in the interior of said conduit means and adjacent said aperture of said gas collector and adapted to accelerate the movement of the combustion gases.

3. A heat generator comprising, in combination, a furnace; a fuel grate within said furnace forming with the same combustion chamber located above said fuel grate and an ash pit located below said fuel grate; a heat exchanger mounted directly above said combustion chamber and in communication therewith so that the combustion gases produced in said combustion chamber pass through said heat exchanger; a gas collecting chamber mounted directly above said heat exchanger and in communication therewith so that the gases which pass through said heat exchanger may be collected in said gas collecting chamber, said gas collecting chamber having an aperture formed in a wall thereof, so that the gases collected in said gas collecting chamber may escape therefrom; a moistening chamber mounted directly beneath said ash pit; means interconnecting said aperture of said gas collecting chamber and said moistening chamber comprising only a single conduit so that said gases in said gas collecting chamber flow directly to said moistening chamber; an atomizer mounted in said moistening chamber adjacent the point where said combustion gases leave said conduit and enter said moistening chamber so that water atomized by said atomizer may be evaporated by said combustion gases; means for supplying water to said atomizer to be atomized thereby; and conduit means interconnecting said moistening chamber and said ash pit so that said combustion gases with the water evaporated therein is conducted to said ash pit.

4. A heat generator comprising, in combination, a furnace; a fuel grate within said furnace forming with the same a combustion chamber located above said fuel grate and an ash pit located below said fuel grate; a heat exchanger mounted directly above said combustion chamber and in communication therewith so that the combustion gases produced in said combustion chamber pass through said heat exchanger; a gas collecting chamber mounted directly above said heat exchanger and in communication therewith so that the gases which pass through said heat exchanger may be collected in said gas collecting chamber, said gas collecting chamber having an aperture formed in a wall thereof, so that the gases collected in said gas collecting chamber may escape therefrom; a moistening chamber mounted directly beneath said ash pit; means interconnecting said aperture of said gas collecting chamber and said moistening chamber comprising only a single conduit so that said gases in said gas collecting chamber flow directly to said moistening chamber; an atomizer mounted in said moistening chamber adjacent the point where said combustion gases leave said conduit and enter said moistening chamber so that water atomized by said atomizer may be evaporated by said combustion gases; means for supplying water to said atomizer to be atomized thereby; an opening formed in the bottom of said moistening chamber for draining off surplus water collected therein; conduit means interconnecting said moistening chamber and said ash pit so that said combustion gases with the water evaporated therein is conducted to said ash pit, said conduit means terminating in a nozzle located in said ash pit; and means for admitting air into said conduit means between said moistening chamber and said nozzle so that said air admitted may mix with said combustion gases and the water evaporated therein.

5. A heat generator comprising, in combination, a furnace; a fuel grate within said furnace forming with the same a combustion chamber located above said fuel grate and an ash pit located below said fuel grate; an entrance opening in said combustion chamber through which fuel is fed upon one end portion of said fuel grate; a smoke box located under said end portion of said fuel grate; a partition wall separating said smoke box from said ash pit; a heat exchanger mounted directly above said combustion chamber and in communication therewith so that the combustion gases produced in said combustion chamber pass through said heat exchanger; a gas collecting chamber mounted directly above said heat exchanger and in communication therewith so that the gases which pass through said heat exchanger may be collected in said gas collecting chamber, said gas collecting chamber having an aperture formed in a wall thereof, so that the gases collected in said gas collecting chamber may escape therefrom; a moistening chamber mounted directly beneath said ash pit; means interconnecting said aperture of said gas collecting chamber and said moistening chamber comprising only a single conduit so that said gases in said gas collecting chamber flow directly to said moistening chamber; an atomizer mounted in said moistening chamber adjacent the point where said combustion gases leave said conduit and enter said moistening chamber so that water atomized by said atomizer may be evaporated by said combustion gases; means for supplying water to said atomizer to be atomized thereby; an opening formed in the bottom of said moistening chamber for draining off surplus water collected therein; conduit means interconnecting said moistening chamber and said ash pit so that said combustion gases with the water evaporated therein is conducted to said ash pit, said conduit means terminating in a nozzle located in said ash pit; means for admitting air into said conduit means between said moistening chamber and said nozzle so that said air admitted may mix with said combustion gases and the water evaporated therein; additional conduit means interconnecting said single conduit and said smoke box to convey part of said combustion gases directly from said gas collecting chamber to said smoke box so as to preheat and dry the fuel on said end portion of said fuel grate and so as to prevent the fire on said fuel grate from extending over said end portion of said fuel grate; and means for releasing a part of the combustion gases in said single conduit to the atmosphere.

6. A heat generator comprising, in combination, a furnace; an inclined fuel grate within said furnace forming with the same a combustion chamber located above said fuel grate and an ash pit located below said fuel grate; an entrance opening in said combustion chamber through which fuel is fed upon one end portion of said fuel grate; a smoke box located under said end portion of said fuel grate; a partition wall separating said smoke box from said ash pit; means for admitting overfire air to said portion of said combustion chamber above said fuel grate; a heat exchanger mounted directly above said combustion chamber and in communication therewith so that the combustion gases produced in said combustion chamber pass through said heat exchanger; a gas collecting chamber mounted directly above said heat exchanger and in communication therewith so that the gases which pass through said heat exchanger may be collected in said gas collecting chamber, said gas collecting chamber having an aperture formed in a wall thereof, so that the gases collected in said gas collecting chamber may escape therefrom; a moistening chamber mounted directly beneath said ash pit; means interconnecting said aperture of said gas collecting chamber and said moistening chamber comprising only a single conduit so that said gases in said gas collecting chamber flow directly to said moistening chamber; an atomizer mounted in said moistening chamber adjacent the point where said combustion gases leave said conduit and enter said moistening chamber so that water atomized by said atomizer may be evaporated by said combustion gases; means for supplying water to said atomizer to be atomized thereby; an opening formed in the bottom of said moistening chamber for draining off surplus water collected therein; conduit means interconnecting said moistening chamber and said ash pit so that said combustion gases with the water evaporated therein is conducted to said ash pit, said conduit means terminating in a nozzle located in said ash pit; means for admitting air into said conduit means between said moistening chamber and said nozzle so that said air admitted may mix with said combustion gases and the water evaporated therein; additional conduit means interconnecting said single conduit and said smoke box to convey part of said combustion gases directly from said gas collecting chamber to said smoke box so as to preheat and dry the fuel on said end portion of said fuel grate and so as to prevent the fire on said fuel grate from extending over said end portion of said fuel grate; and means for releasing a part of the combustion gases in said single conduit to the atmosphere.

PIERRE GEORGES VICARD.

REFERENCES CITED

The following references are of record in the file of this patent:

UNITED STATES PATENTS

| Number | Name | Date |
|---|---|---|
| 618,863 | Goff | Feb. 7, 1889 |
| 963,953 | Smith | July 12, 1910 |
| 1,139,194 | Kleman | May 11, 1915 |
| 1,450,127 | Witz | Mar. 27, 1923 |
| 1,829,996 | Lysholm et al. | Nov. 3, 1931 |
| 1,845,415 | Huber | Feb. 16, 1932 |
| 2,010,985 | Ford | Aug. 13, 1935 |